J. & E. NEVISON
Mole-Plow.
No. 22,194.
Patented Nov. 30, 1858
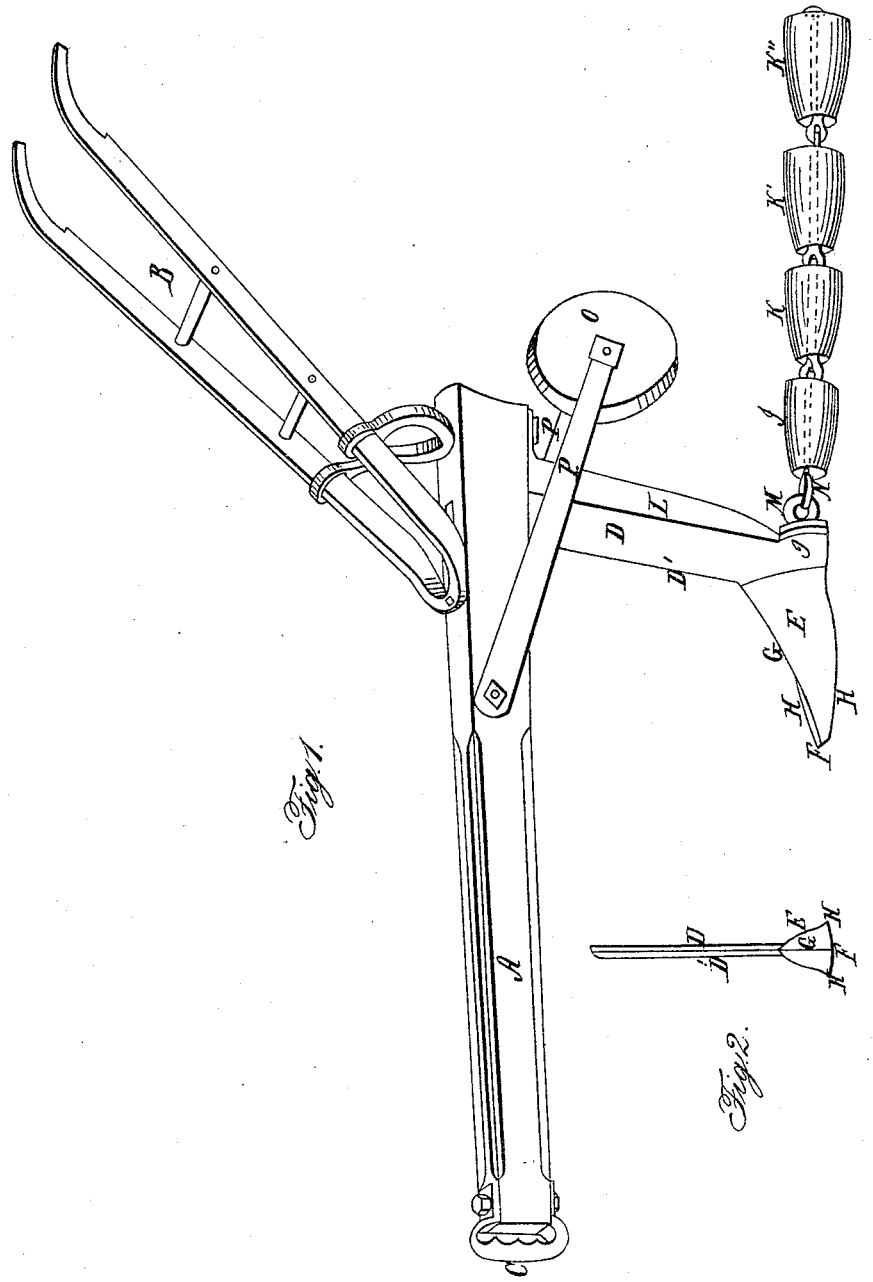

UNITED STATES PATENT OFFICE.

J. NEVISON AND E. NEVISON, OF MORGAN, OHIO.

IMPROVEMENT IN UNDER-DRAIN PLOWS.

Specification forming part of Letters Patent No. 22,194, dated November 30, 1858.

*To all whom it may concern:*

Be it known that we, JAMES NEVISON and EDWARD NEVISON, of Morgan, in the county of Ashtabula and State of Ohio, have invented certain new and useful Improvements in Under-Drain Plows; and we do hereby declare the following to be a full and complete description thereof, reference being had to the accompanying drawings, in which—

Figure 1 is a perspective view of the plow; Fig. 2, a section of the same, which will be referred to hereinafter.

Like letters designate like parts in the different views.

A represents the beam, to which may be attached the handles B and clevis C in any convenient manner. Near the rear end of the beam is secured by any of the ordinary means the upper end of the shank D, and to the lower end is connected the peculiar shaped plow E. The form of this plow may be varied, if desirable. The point F of the plow is sharp, and also the ridge G, which passes along the center of the plow to the shank D, which shank is thin and presents a cutting-edge at D' in line with the ridge G. The sides at H H present cutting-edges. The heel I of the plow is rounded and may be a little smaller than the first drag, I. The following drags, K K' K'', which constitute articulating drags, may be increased in size gradually from I to K''; or they may be of a uniform size. The drags are so connected together as to articulate at the point of connection, by which means drains of various curves may be made as well as straight ones, and the plow and drags more easily accommodate themselves to obstructions in the ground than if rigid.

From the heel of the plow extends a brace, L, which is bolted at the upper end to the beam, or otherwise secured. This brace aids in giving strength to the shank D, and, if desirable, the shank and brace may be made entire.

To the rear end of the plow is attached a loop or hook, M, to which is connected the link N, on which is placed the conical drag I. Each drag is secured to a link, by which they are connected together.

The drags, it will be observed, are tapering toward the plow for the purpose of allowing them to pass through the ground more easily, and the drain is made more smooth and perfect thereby, as the earth composing the sides of the drain is gradually pressed out, which leaves the wall compact and smooth. By having the drags gradually increase in size from I to K'' the walls are gradually pressed out, which in practice is found to prevent any crumbling or tearing away of the walls, and by the means of the drags the earth is so compressed that the walls have been found in good condition after being subject to the influence of frost.

The general form of the plow is that of a boot having cutting-edges, before indicated, similar to the edge of the point or landside of a plow, which allows the plow to cut its way more easily through the land and not disturb any more earth than comes within the size of the drag.

The shank D and brace L are made as thin as a due regard to strength will permit, and the width increased. There being but little lateral strain, thickness is not essential, the strain being in the line of draft. The width being increased in the line of draft, it is rendered capable of sustaining all necessary strain for this purpose, while the thinness of the shank allows it to cut its passage through the sod and earth. This cut in the sod and earth is closed up by the concave roller O, which trails upon the ground behind the shank, and is connected to the beam by the arms P P, which allows the roller to rise and fall and adjust itself to the condition of the ground. As almost all land which requires draining must be consequently of a soft character, the weight of the roller will, as it rolls along, close up the cut of the shank in the sod, and for the same reason this machine works with comparatively the same ease and speed as in ordinary plowing, depending to a certain extent upon the depth the drain is to be and its size. The adjustable pressure-roller O acts when the first drag enters the opening made by the plow. By this means the earth which is disturbed by the plow is compressed upon the first drag, and the opening or cut caused by the shank D is also closed up at the same time. By this means the drags following the first and the roller enter the compact earth, which causes the walls of the drain thus formed by the following drags to be more compressed or compact, which makes the drain firmer and stronger than if the drags followed the plow without the earth being compressed by the action of the roller. It will thus be seen that the drags K K' K'' act directly after the passage of the roller, which secures a compressed and firm roof to the drain, but which would not be the case if the earth above were loose and uncompressed. There being less resistance above than at the sides or below the plow, it is important that the earth be compressed as set forth. The plow being triangular or irregular in form, and being less in diameter than the drags, which are of a regular form, the plow will pass through the earth with more ease and facility than a regular shape, which has not this special adaptation, and the drags, being of a regular form, will more perfectly compress the irregular opening of the plow into a circular or continuous arched drain.

In the use of this plow drain-digging and drain-tiles are dispensed with, and the cheapness and rapidity with which drains may be made with our improved plow are such that in case the same field should require it every year it would be much less expensive than the ordinary mode of draining.

The articulating drags may be constructed with angular sides; but the round are deemed preferable, as they leave the drain round or arched, which makes it less liable to cave in than one of angular sides.

More or a less number of drags may be used than herein represented without changing the nature of this invention.

What we claim as our improvement, and desire to secure by Letters Patent, is—

The adjustable weighted roller O, in combination with the plow and drags, as set forth, and operating conjointly, for the purpose described.

JAMES NEVISON.
EDWARD NEVISON.

Witnesses:
GEORGE W. LAWTON,
ED. A. WRIGHT.